United States Patent
Mizuta (10) Patent No.: US 8,295,888 B2
(45) Date of Patent: Oct. 23, 2012

(54) PORTABLE TERMINAL DEVICE, AUDIO OUTPUT DEVICE, AND AUDIO DEVICE

(75) Inventor: Satoshi Mizuta, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 798 days.

(21) Appl. No.: 12/093,285

(22) PCT Filed: Nov. 9, 2006

(86) PCT No.: PCT/JP2006/322367
§ 371 (c)(1),
(2), (4) Date: Jun. 2, 2009

(87) PCT Pub. No.: WO2007/055274
PCT Pub. Date: May 18, 2007

(65) Prior Publication Data
US 2010/0035662 A1    Feb. 11, 2010

(30) Foreign Application Priority Data
Nov. 11, 2005   (JP) ................................. 2005-327743

(51) Int. Cl.
*H04M 1/00*         (2006.01)
(52) U.S. Cl. .................. 455/569.1; 455/556.1; 455/418; 463/20; 381/59
(58) Field of Classification Search .............. 455/569.1, 455/556.1, 418; 463/20; 381/59
See application file for complete search history.

(56) References Cited

U.S. PATENT DOCUMENTS

| | | | |
|---|---|---|---|
| 7,764,797 B2 * | 7/2010 | Yamamoto et al. | 381/59 |
| 2001/0031651 A1 * | 10/2001 | Nakae et al. | 455/572 |
| 2003/0109289 A1 | 6/2003 | Ito | 455/567 |
| 2003/0125075 A1 | 7/2003 | Klovborg | |
| 2006/0015553 A1 * | 1/2006 | Takahashi et al. | 708/708 |
| 2006/0025206 A1 * | 2/2006 | Walker et al. | 463/20 |

FOREIGN PATENT DOCUMENTS

| | | |
|---|---|---|
| EP | 1231762 A1 | 8/2002 |
| JP | 01-305753 | 12/1989 |
| JP | 7-183938 | 7/1995 |
| JP | 10-136063 | 5/1998 |
| JP | 11234792 A | 8/1999 |

(Continued)

OTHER PUBLICATIONS

European search report for corresponding European application 06823254.5 lists the references above.

(Continued)

*Primary Examiner* — Danh Le
(74) *Attorney, Agent, or Firm* — DLA Piper LLP (US)

(57) ABSTRACT

A portable terminal device able to suppress a feeling of strangeness caused by audio not desired by a user is provided. A mobile phone 2 has an audio output portion 33 outputting an audio signal, and can make a speaker 23 arranged in a cradle device 3 output audio in accordance with the audio signal therefrom by outputting the audio signal from the audio processing portion 33 to the cradle device 3 when it is connected to the connectable cradle device 3. The mobile phone 2 has an external speaker output control portion 43 for restricting the output of the audio signal to the speaker 23 when the type of the audio signal output from the audio processing portion 33 is a specific type.

2 Claims, 9 Drawing Sheets

FOREIGN PATENT DOCUMENTS

| | | |
|---|---|---|
| JP | 2000-286926 | 10/2000 |
| JP | 2001-189778 | 7/2001 |
| JP | 2002-204290 | 7/2002 |
| JP | 2003-101618 | 4/2003 |

OTHER PUBLICATIONS

Korean language office action dated Jan. 28, 2011 and its English language translation for corresponding Korean application 20087014003 lists the reference above.

Japanese language office action and its English language translation for corresponding Japanese application 2005327743.

English language translation of Korean office action dated Jun. 25, 2010 for corresponding Korean application 1020087014003.

Chinese language office action dated Mar. 9, 2011 and its English language translation for corresponding Chinese application 200680050951.3.

* cited by examiner

| TYPE | OUTPUT |
|---|---|
| USUAL AUDIO NOTICE (USUAL SENDER) | 0% |
| USUAL AUDIO NOTICE (SPECIFIC SENDER) | 0% |
| SPECIFIC AUDIO NOTICE (SPECIFIC SENDER) | 100% |
| ALARM | 50% |
| RADIO | 100% |
| MUSIC PLAYBACK | 00% |

PORTABLE TERMINAL DEVICE, AUDIO OUTPUT DEVICE, AND AUDIO DEVICE

TECHNICAL FIELD

The present invention relates to a mobile phone or other portable terminal device, a cradle device or other audio output device connected to the portable terminal device, and an audio device having a portable terminal device and audio output device.

BACKGROUND ART

The technique of outputting audio which is output by a portable terminal device from an apparatus connected to the portable terminal device is known. For example, Patent Document 1 discloses a technique of outputting audio which is output by a mobile phone from a speaker provided in a mobile phone desktop holder or other cradle device for charging the mobile phone.
Patent Document 1: Japanese Patent Publication (A) No. 2003-101618

DISCLOSURE OF THE INVENTION

Problem to be Solved by the Invention

However, in Patent Document 1, an audio notice for informing the user of signal receptions to the mobile phone is also output from the speaker provided in the mobile phone desktop holder or other cradle device. Accordingly, when there is an signal reception at the mobile phone in a state where it is connected to the mobile phone desktop holder or other cradle device, the audio notice, that is, audio not desired by the user, is suddenly output, so the user feels strange.

An object of the present invention is to provide a portable terminal device, an audio output device, and an audio device able to suppress the feeling of strangeness occurring due to the audio not desired by the user.

Means for Solving the Problem

A portable terminal device of the present invention has an audio output portion outputting an audio signal and, when an audio output device at which a speaker is arranged is connected to it, able to output the audio signal toward the audio output device so as to make it output audio in accordance with the audio signal from the speaker and an output restriction portion restricting the output of the audio signal to the audio output device if the type of the audio signal output from the audio output portion is a specific type.

An audio output device of the present invention has a speaker able to output audio in accordance with an audio signal output from a connectable portable terminal device when the portable terminal device is connected and an output restriction portion restricting the output of the audio from the speaker if the type of the audio signal output from the portable terminal device is a specific type.

An audio device of the present invention has a portable terminal device, an audio output device configured so that it can be connected to the portable terminal device and can output audio in accordance with an audio signal output from the portable terminal device from the speaker when it is connected to the portable terminal device, and an output restriction portion restricting the output of the audio from the speaker if the type of the audio signal output from the portable terminal device is a specific type.

Effect of the Invention

According to the present invention, the output of audio not desired by the user is restricted, so the feeling of strangeness occurring due to audio not desired by the user is suppressed.

BRIEF DESCRIPTION OF THE DRAWINGS

FIG. 2 Front views including partial see-through views showing a state where the mobile phone of FIG. 1B and FIG. 1C is placed in the cradle device of FIG. 1A.

FIG. 3 Side views including partial see-through views showing a state where the mobile phone of FIG. 1B and FIG. 1C is placed in the cradle device of FIG. 1A.

DESCRIPTION OF NOTATIONS

1 . . . audio device, 2 . . . mobile phone (portable terminal device), 3 . . . cradle device (audio output device), 23 . . . speaker, 33 . . . audio processing portion (audio output portion), and 43 . . . external speaker output control portion (output restriction portion).

BEST MODE FOR CARRYING OUT THE INVENTION

First Embodiment

Figure 1A:
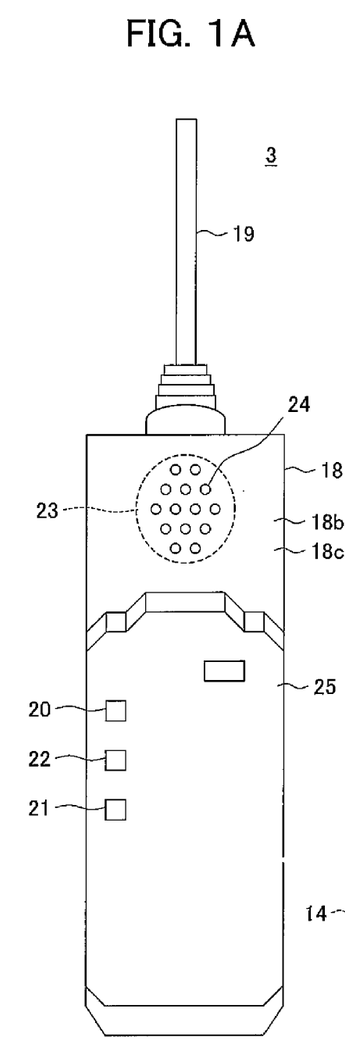
FIG. 1 Front views including partial see-through views showing a mobile phone and a cradle device according to a first embodiment of the present invention.
Figure 1B:
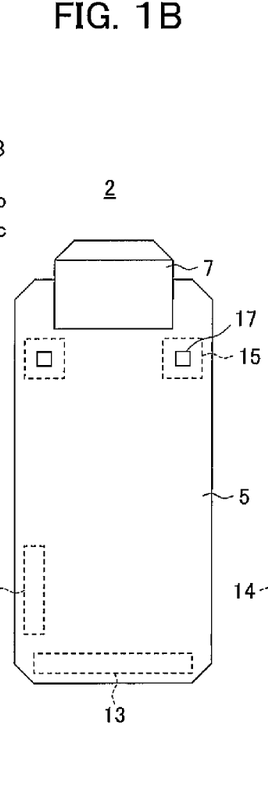
Figure 1C:
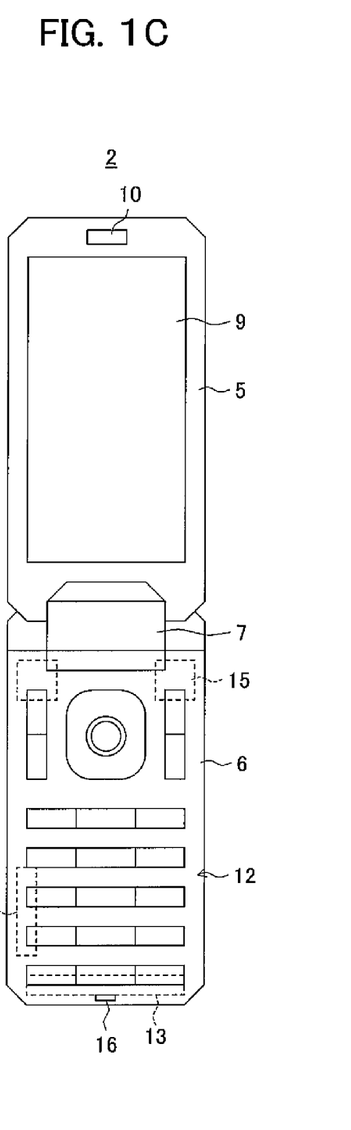

FIG. 1A to FIG. 1C are plan views including partial see-through views showing a mobile phone 2 as a portable terminal device and a cradle device 3 as an audio output device according to a first embodiment of the present invention, in which FIG. 1A shows the cradle device 3, FIG. 1B shows the mobile phone 2 in a closed state, and FIG. 1C shows the mobile phone in an open state.

Figure 2A:
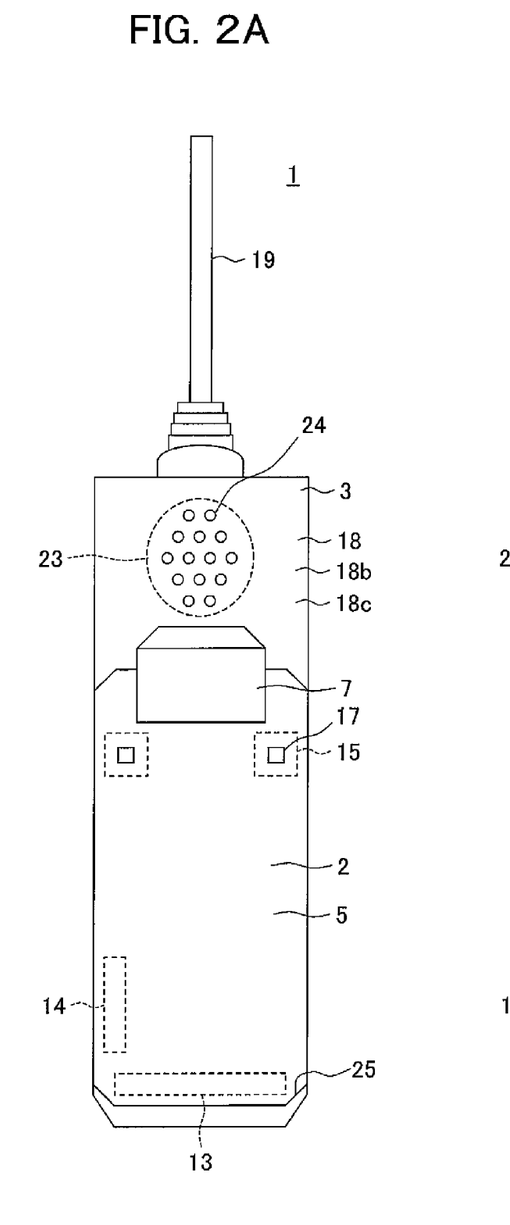
Figure 2B:
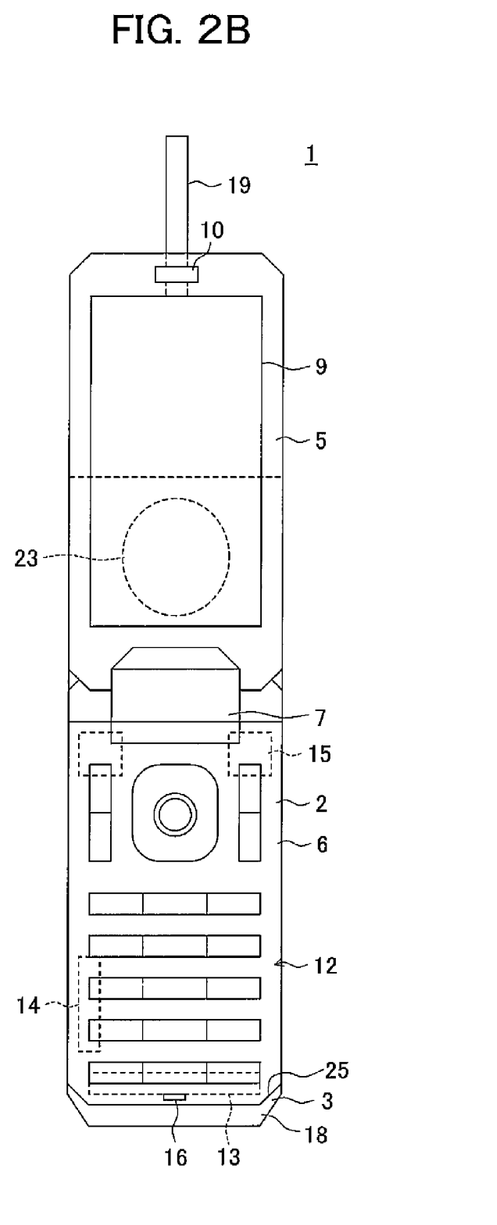

FIG. 2A and FIG. 2B are plan views including partial see-through views showing a state where the mobile phone 2 is placed in the cradle device 3, in which FIG. 2A shows a case where the mobile phone 2 is closed, and FIG. 2B shows a case where the mobile phone 2 is opened.

Figure 3A:
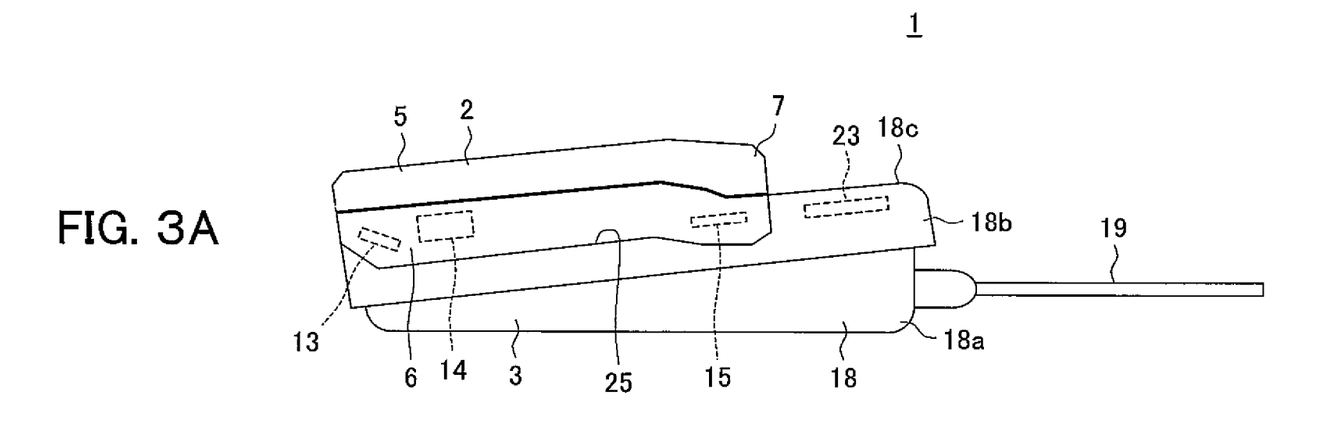
Figure 3B:
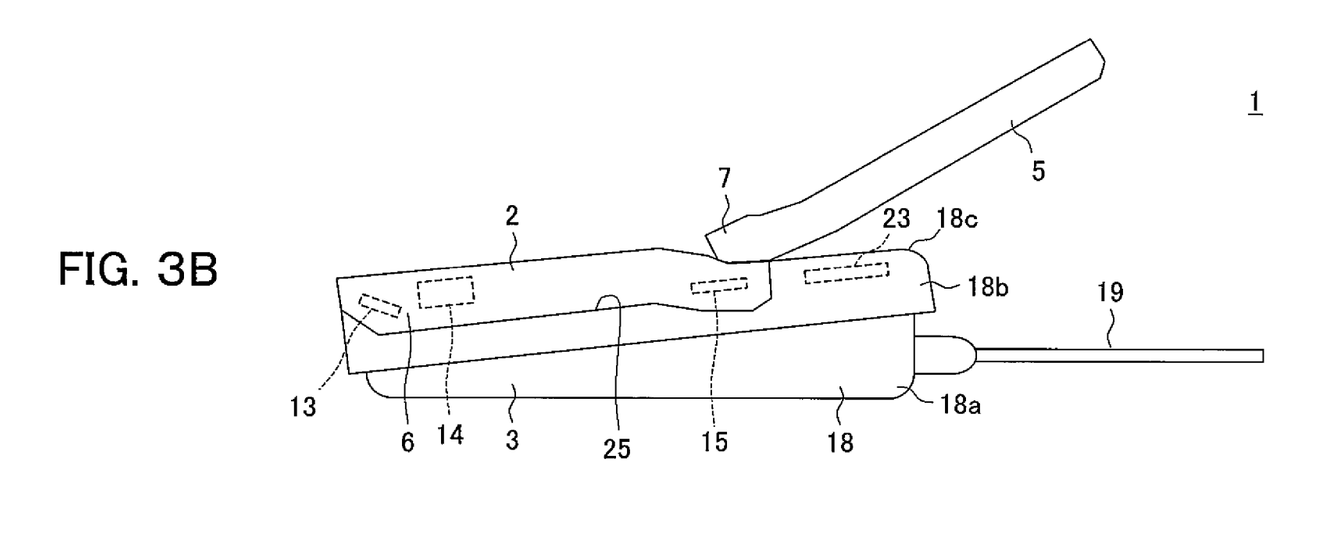

FIG. 3A and FIG. 3B are side views including partial see-through views showing a state where the mobile phone 2 is placed in the cradle device 3, in which FIG. 3A shows a case where the mobile phone 2 is closed, and FIG. 3B shows a case where the mobile phone 2 is opened.

Note that an audio device 1 is configured by a combination of the mobile phone 2 and the cradle device 3.

The mobile phone 2 is configured as so-called a flip-open type mobile phone and is provided with a receiver case 5 and a transmitter case 6. The receiver case 5 and transmitter case 6 are connected at their end portions by a connection portion 7, so the mobile phone 2 can be opened/closed pivoting about the connection portion 7. The receiver case 5 and transmitter case 6 are formed as generally thin parallelepiped bodies. In the closed state, they are superimposed on each other and their contours substantially coincide with each other when one case side is seen from the other case side.

The receiver case 5 is formed into a generally thin parallelepiped shape by for example a resin. The receiver case 5 is provided with a display portion 9 for displaying images on a facing surface facing the transmitter case 6 in the closed state. The display portion 9 is configured by for example a liquid crystal display. Note that the receiver case 5 is provided with, other than this, a speaker 39 for speech (see FIG. 4). A sound output port 10 of the speaker is provided in the facing surface.

The transmitter case 6 is formed into a generally thin parallelepiped shape by for example a resin. The transmitter case 6 is provided with an operation portion 12 accepting operations of the user, a main antenna 13 and a sub antenna 14 for transmitting/receiving radio waves, speakers 15 outputting audio notices etc., a microphone 35 for speech (see FIG. 4), and a sound guide hole 16 of the microphone 35.

The main antenna 13 is built in an end portion on the opposite side to the connection portion 7 of the transmitter case 6. The sub antenna 14 is built in the transmitter case 6 on the side surface side of the transmitter case 6 at a position between the center of the transmitter case 6 and the main antenna 13. The main antenna 13 and sub antenna 14 are configured as diversity antennas. For example, the main antenna 13 is used for transmission/reception etc. of speech and mail and constantly utilized. The sub antenna 14 is utilized together with the main antenna 13 when data communication other than audio speech is carried out, for example, when music is downloaded.

The speakers 15 are built in the end portion of the transmitter case 6 on the connection portion 7 side. Two are provided at the sideward sides of the transmitter case 6. In the end portion on the connection portion 7 side of the transmitter case 6, sound output holes 17 opened in a surface opposite to the surface facing the receiver case 5 (surface facing the cradle device) and outputting audio output by the speakers 15 are provided. Note that the sound output holes 17 may be provided so as to be opened at side surfaces of the transmitter case 6 as well. The speakers 15 are for example used for the output of audio notices for informing the user of signal receptions, erroneous operation, etc., the output of audio of the other party in a conversation when speaking by utilizing a hands-free function, and audio output in playing back music and video.

The cradle device 3 has a housing 18, a cord 19 for supplying power to the cradle device 3, charging terminals 20 and 21 and an audio signal terminal 22 for electrically connecting the cradle device 3 and mobile phone 2, and a speaker 23 outputting audio based on the audio signal input from the mobile phone 2 via the audio signal terminal 22.

The housing 18 is provided with for example a lower cover 18a placed on a desk or the like and an upper cover 18b covered over the lower cover 18a. The lower cover 18a and upper cover 18b are formed by for example a resin. The upper cover 18b is covered over the lower cover 18a so that it is inclined relative to the plane on which the housing 18 is placed. The housing 18 is formed, as a whole, in a trapezoidal shape having an inclined surface 18c inclined relative to the plane (desk surface etc.) on which the housing 18 is placed.

At the upper surface of the housing 18, a recess (placing part) 25 for placing the mobile phone 2 therein is formed. The recess 25 is provided below the inclined surface 18c. The recess 25 is formed to a shape with which the transmitter case 6 of the mobile phone 2 can fit and is formed so that a bottom portion against which the back surface of the transmitter case 6 abuts is inclined relative to the plane (desk surface etc.) on which the cradle device 3 is placed. The mobile phone 2 is placed in the cradle device 3 by fitting and inserting the transmitter case 6 in the recess 25 so that the connection portion 7 side is oriented toward the top side of the inclined surface 18c.

Note that the placement position of the transmitter case 6 relative to the housing 18 of the cradle device 3 is defined by the recess 25, the placement position of the speaker 23 is fixed with respect to the housing 18 of the cradle device 3. Namely, the positional relationship of the transmitter case 6 with respect to the speaker 23 when the transmitter case 6 is placed in the recess 25 is constant. That positional relationship is an example of the predetermined positional relationship of the present invention.

As shown in FIG. 3A and FIG. 3B, the depth of the recess 25 is substantially equivalent to or less than the thickness of the transmitter case 6. Accordingly, even when the mobile phone 2 is opened and closed in a state where the mobile phone 2 is placed in the recess 25, a circumferential edge of the recess 25 of the inclined surface 18c does not abut against the receiver case 5, so opening/closing of the mobile phone 2 is not prevented.

The cord 19 is extended from the housing 18. A not shown power plug is provided at its front end. By insertion of the power plug into a power receptacle for supplying power having a commercial use frequency, power is supplied to the cradle device 3 via the cord 19.

Charging terminals 20 and 21 are provided so as to protrude from the bottom portion of the recess 25 and abut against the charging terminals 37 (see FIG. 4) provided in the transmitter case 6 of the mobile phone 2 and connected when the mobile phone 2 is inserted and fitted in the recess 25.

The audio signal terminal 22 is provided so as to protrude from the bottom portion of the recess 25. Further, it is provided adjacent to the charging terminals 20 and 21. When the mobile phone 2 is inserted and fitted in the recess 25, the audio signal terminal 22 abuts against the audio signal terminal (output portion) 36 (see FIG. 4) provided in the transmitter case 6 of the mobile phone 2 to be connected with it.

The speaker 23 is provided at the inclined surface 18c upward from the recess 25. The speaker 23 is placed so that the sound output surface faces the back surface of the inclined surface 18c (faces upward). Sound output holes 24 for outputting audio output from the speaker 23 are provided in the inclined surface 18c.

Note that, in the mobile phone 2, the connection portion 7 is placed in the recess 25 so as to face the speaker 23, and the main antenna 13 and sub antenna 14 are provided on the end portion side opposite to the connection portion 7. Therefore, the main antenna 13 and sub antenna 14 are placed at positions away from the speaker 23 in the housing of the mobile phone 2.

Further, the speaker 23 is provided on the upper side of the inclined surface 18c, while the main antenna 13 and sub antenna 14 are provided on a lower side of the inclined surface 18c. Therefore, the main antenna 13 and sub antenna 14 are placed at slightly lower positions (different positions) in the vertical direction than the speaker 23.

Note that only one of the main antenna 13 and sub antenna 14 may be placed at a position away from the speaker 23 or a position different from the placement position of the speaker 23 in the vertical direction.

Figure 4:
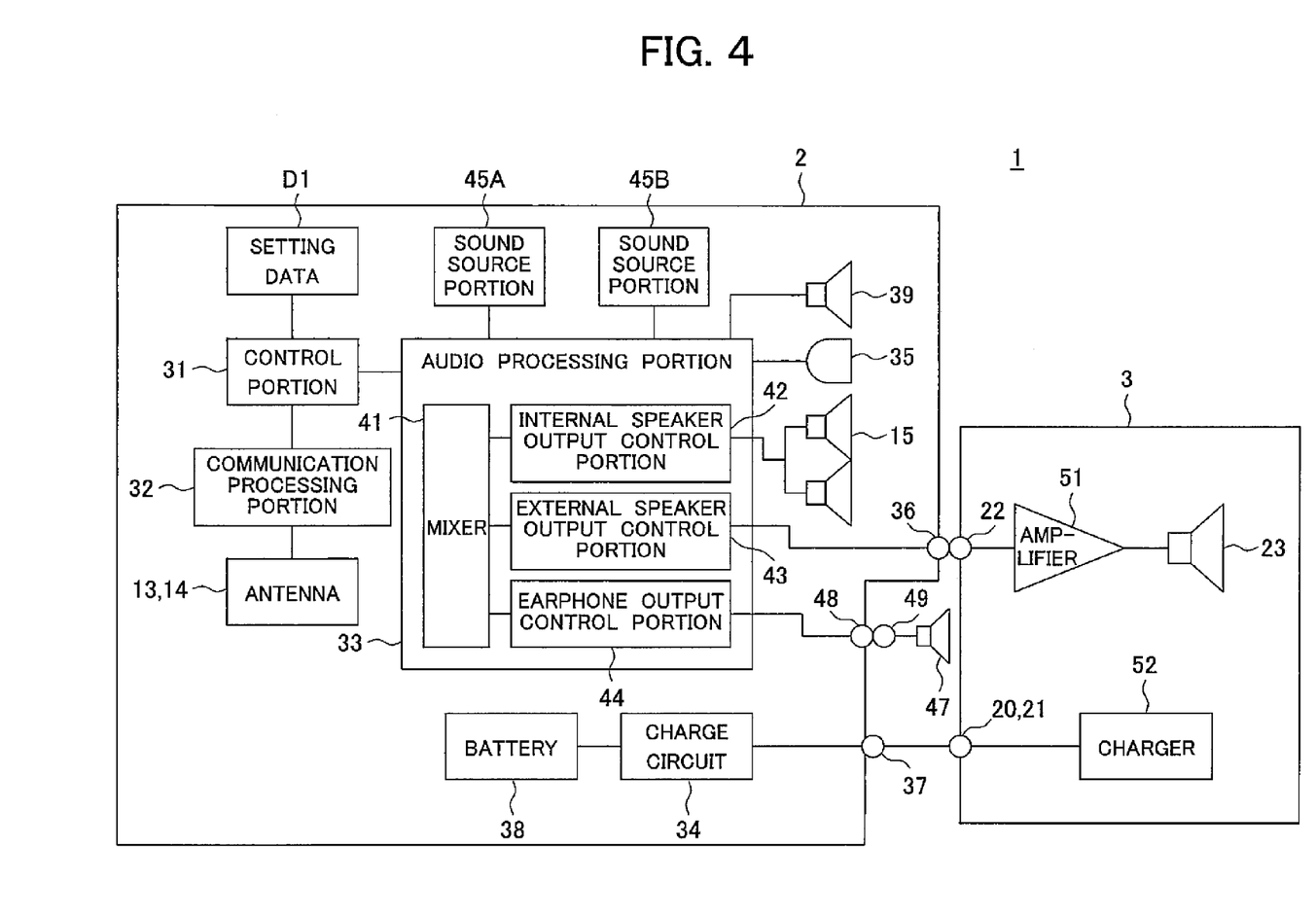
FIG. 4 A block diagram showing configurations of signal processing systems of the mobile phone and cradle device of FIG. 1A to FIG. 1C.

FIG. 4 is a block diagram showing configurations of signal processing systems of the mobile phone 2 and cradle device 3.

The mobile phone 2 is provided with a control portion 31 controlling operations of the various electronic components, a communication processing portion (communicating means) 32 for performing wireless communication, an audio processing portion (audio outputting means) 33 performing processing on the audio output, and a charge circuit 34. Note that the mobile phone 2 is provided with, other than these, an image processing portion converting video data from the control portion 31 to a video signals and outputting it to the display portion 9, and other various means, but illustration is omitted.

The control portion 31 is configured by an IC including for example a CPU, ROM, or RAM and executes various processing based on the signals from the operation portion 12 and data stored in the storage device etc.

For example, the control portion 31 executes various processing based on data output from the communication processing portion 32 and processes the data output from the communication processing portion 32. For example, when there is a call (signal received) for speech or reception of e-mail from another phone etc., it requests the audio processing portion 33 to output a predetermined audio notice. When going to engage in speech with the other phone etc., it requests the audio processing portion 33 to output an audio signal of speech corresponding to the data output from the communication processing portion 32. Note that, as the audio notice, audio stored in a sound source IC etc. of the mobile phone 2 by the manufacturer may be utilized or audio (music etc.) stored in the storage device of the mobile phone 2 by download etc. by the user may be utilized as well.

Further, the control portion 31 counts the time based on its own clock and receives a radio wave including a time code to correct the time, so thereby functions as a so-called radio clock as well. Further, when the time set by an input operation with respect to the operation portion 12 comes, the control portion 31 requests the audio processing portion 33 to output an audio signal of a predetermined alarm sound. Namely, the control portion 31 functions as an alarm function portion.

The communication processing portion 32 includes a high frequency circuit and performs wireless communication utilizing electric waves. Specifically, the communication processing portion 32 modulates audio data, image data, and other various data processed at the control portion 31 etc. and transmits the same via the main antenna 13. Further, the communication processing portion 32 demodulates signals received via the main antenna 13 and sub antenna 14 and outputs the same to the control portion 31 etc.

The audio processing portion 33 converts the audio signal from the microphone 35 to audio data and outputs the same to the control portion 31 etc. and converts the audio data from various types of sound sources to audio signals and outputs the same to the speaker 39 etc. The audio processing portion 33 is provided with for example a mixer 41 mixing and switching audio signals, an internal speaker output control portion 42 for controlling the output of the speakers 15, an external speaker output control portion 43 for controlling the output of the speaker 23, and an earphone output control portion 44 controlling the output of the earphone 47. Note that the audio processing portion 33 includes an amplifier and other various function portions, but illustration is omitted.

The mixer 41 mixes (adds) the audio signal corresponding to speech passed through the communication processing portion 32 and audio signals from a plurality of sound source portions 45A and 45B (hereinafter sometimes simply referred to as "sound source portions 45") or switches (selects) them and outputs. An audio signal is for example an electric signal having a voltage of a waveforms corresponding to the waveform of audio. The mixer 41 superimposes waveforms of audio signals from sound source portions 45 on each other and outputs the result. Alternatively, the mixer 41 selects output route to which audio signals from sound source portions are output and outputs the audio signals to the selected output route.

The sound source portion 45 holds or receives information required for generating audio signals. For example, it is a sound source IC holding audio data corresponding to audio notices, alarm sounds or other audio utilized for a user interface, a storage device holding data of music acquired by download etc. by the mobile phone 2, or a radio or other broadcast receiver receiving an radio wave including audio information and outputting an audio signal. Note that, in FIG. 4, the fact that there are two sound source portions 45 is only an example.

The internal speaker output control portion 42 controls (restricts) the output of the audio signal output from the mixer 41 and outputs the result to the speakers 15. For example, the internal speaker output control portion 42 includes an FET or other switch cutting off or permitting electric connection between the mixer 41 and speakers 15. Alternatively, it includes a variable attenuator which reduces an amplitude of the voltage of the audio signal by a predetermined ratio. Note that, it is also possible to configure this by including an amplifier and restrict the output by lowering the amplification ratio. The operation of the internal speaker output control portion 42 is controlled by the control portion 31. For example, when the earphone 47 is connected to the mobile phone 2 during listening to music, the internal speaker output control portion 42 prevents the audio signal from being output to the speakers 15.

The external speaker output control portion 43 controls (restricts) the output of the audio signal output from the mixer 41 and outputs the audio signal to the audio signal terminal 36. The configuration of the external speaker output control portion 43 is the same as that of the internal speaker output control portion 42 and includes a switch, attenuator, etc. Further, the operation of the external speaker output control portion 43 is controlled by the control portion 31. For example, when the earphone 47 is connected to the mobile phone 2 during listening to music, the external speaker output control portion 43 prevents the audio signal from being output to the audio signal terminal 36.

The earphone output control portion 44 controls (restricts) the output of the audio signal output from the mixer 41 and outputs the result to an earphone use audio signal terminal 48. The configuration of the earphone output control portion 44 is the same as that of the internal speaker output control portion 42 and includes a switch, attenuator, etc. The operation thereof is controlled by the control portion 31.

In this way, the output control portions 42, 43, and 44 control the output of the audio signal output from the audio processing portion 33 via the mixer 41. They are configured so that the output of the audio signal can be cut or reduced to restrict it by using for example a switch or variable attenuator. Note that, they only have to be configured so as to control the volumes, characteristics, etc. of audios output from the speakers 15 and 23 and earphone 47 as the configuration for controlling (restricting) the output of the audio signal.

The charge circuit 34 converts the power supplied to the charging terminal 37 to a power having a suitable voltage and supplies this to a battery 38 serving as the power source of the mobile phone 2. Further, it starts charging (supplying power) to the battery 38 or interrupts the charging in accordance with the charged state etc. of the battery 38.

The cradle device 3 is provided with an amplifier 51 and a charger (AC converter) 52. The amplifier 51 amplifies the audio signal input from the mobile phone 2 via the audio signal terminal 22 and outputs the same to the speaker 23. The charger 52 converts an AV current having a commercial frequency and supplied via the cord 19 to a DC current having a suitable voltage and outputs the same to the charging terminals 20 and 21. Note that the cradle device 3 need not have a charge function.

The earphone 47 is electrically connected to the mobile phone 2 by connection with earphone use audio signal terminals 49 and 48 and outputs audio in accordance with an audio signal input via the earphone use audio signal terminals 48 and 49.

Figure 5A:
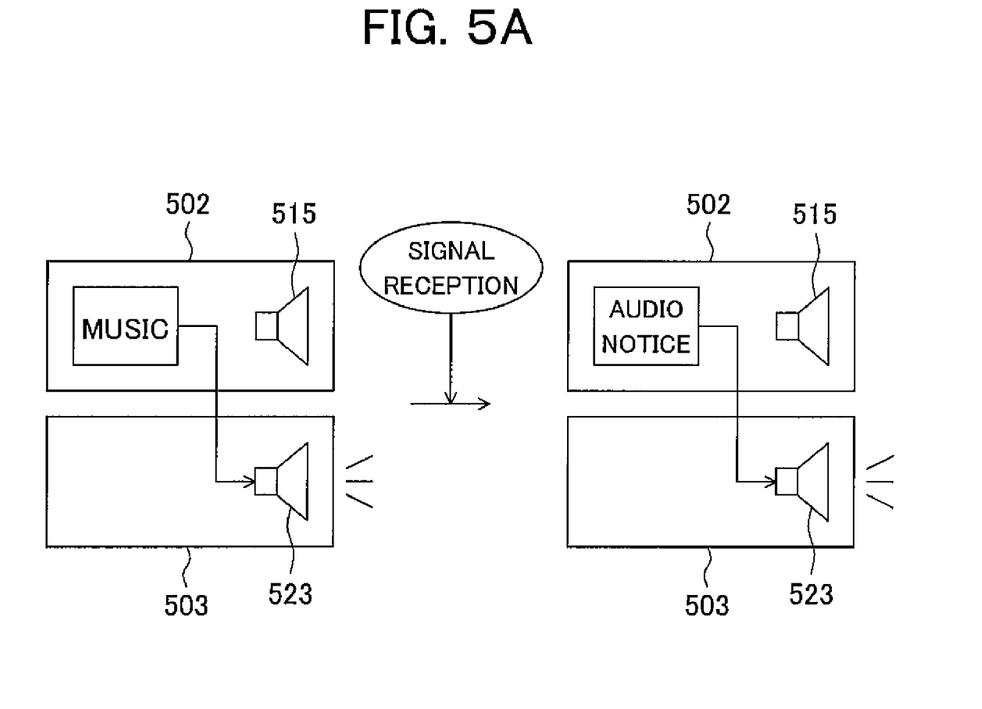
FIG. 5 Conceptual views for explaining the operation of the mobile phone of FIG. 1B and FIG. 1C in comparison with the prior art.
Figure 5B:
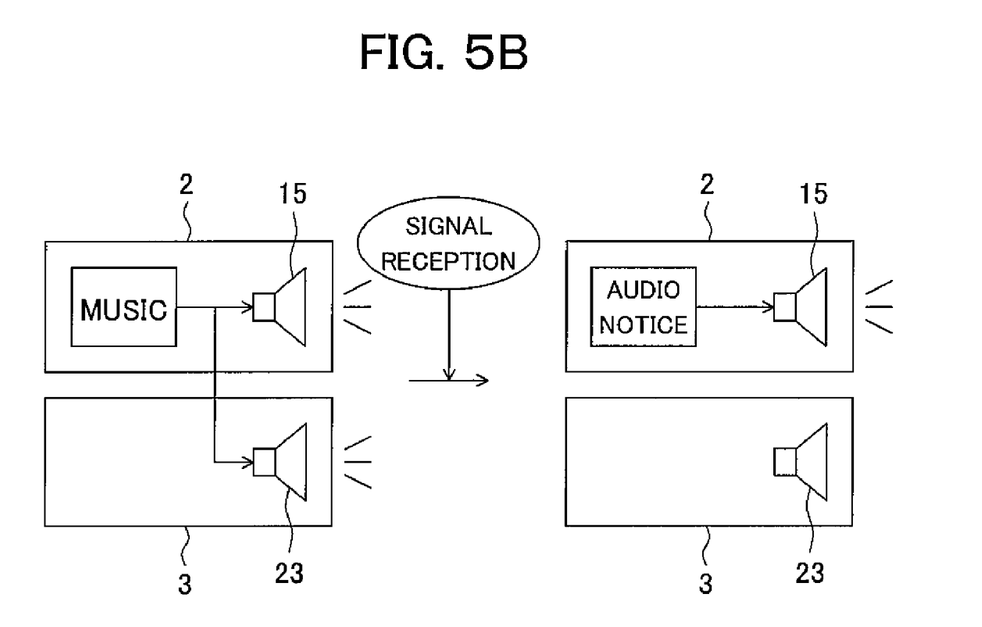

FIG. 5A and FIG. 5B are conceptual views showing an example of the operation of the mobile phone 2 in comparison with the conventional mobile phone, in which FIG. 5A shows the operation of a conventional mobile phone, and FIG. 5B shows the operation of the mobile phone 2.

As shown in the left diagram of FIG. 5A, in a conventional mobile phone 502, when music is played back by the mobile phone 502 in a state where the mobile phone 502 is connected to a cradle device 503, the music was not output from a speaker 515 of the mobile phone 502, but output from a speaker 523 of the cradle device 503 (for example, Patent Document 1).

On the other hand, there is known a conventional mobile phone wherein when playing back music by the speaker of the mobile phone, the playback of the music is stopped and an audio notice (signal reception sound) is output when a signal is received at the mobile phone during playback.

When a conventional mobile phone 502 suspending the playback of music and outputting an audio notice as explained above is connected to the cradle device 503, as shown in the right diagram of FIG. 5A, the playback of the music is stopped and an audio notice is output from an external speaker 523 of the cradle device 503.

In this case, there is a high possibility that the volume of the speaker 523 of the cradle device 503 has been set large for listening to the music. The audio notice is suddenly output with a large volume in comparison with a case where the mobile phone 502 is not connected to the cradle device 503, so the user feels strange.

In the mobile phone 2 of the present embodiment, during music playback, as shown in the left diagram of FIG. 5B, the music is output from both of the speakers 15 of the mobile phone 2 and the speaker 23 of the cradle device 3. However, it is also possible to output music from only the speaker 23 of the cradle device 3.

Further, when there is an signal reception, as shown in the right diagram of FIG. 5B, the mobile phone 2 suspends (restricts) the output of the audio signal to the speaker 23 of the cradle device 3. Due to this, the audio notice is output from the speakers 15 of the mobile phone 2, but is not output from the speaker 23 of the cradle device 3. Accordingly, the user hears the audio notice with a volume (sound pressure) equivalent to that in a case where the mobile phone 2 is not placed on the cradle device 3, so no feeling of strangeness is caused.

Figure 6A:
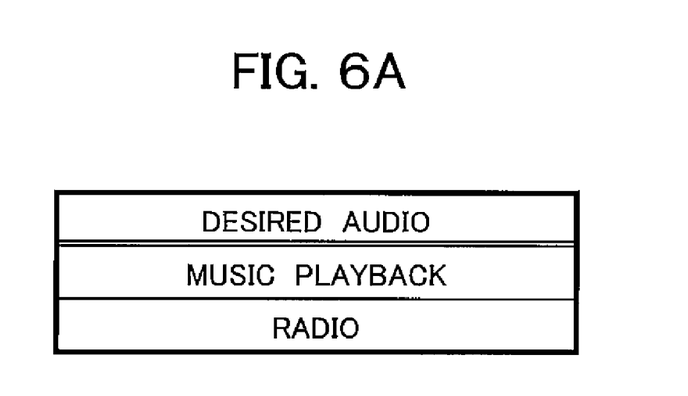
FIG. 6 Conceptual views illustrating the content of setting data recorded in a storage device of the mobile phone of FIG. 1B and FIG. 1C.

FIG. 6A is a conceptual view showing an example of setting data D1 held in the storage device of the mobile phone 2 in order to realize the operation of FIG. 5B.

In the setting data D1, the type of the audio that should be output from the cradle device 3, in other words, the type of audio (audio signal) desired by the user to be output from the cradle device 3, is held. FIG. 6A illustrates a case where the playback of music data (music playback) stored by download or the like by the mobile phone 2 and the output of radio broadcasts received by the mobile phone 2 are listed. Note that the information held in the setting data D1 may be input by the manufacturer of the mobile phone 2 or may be freely input by the user of the mobile phone 2. Further, the type of the audio not desired by the user may be held in place of the type of the audio desired by the user.

Figure 7:
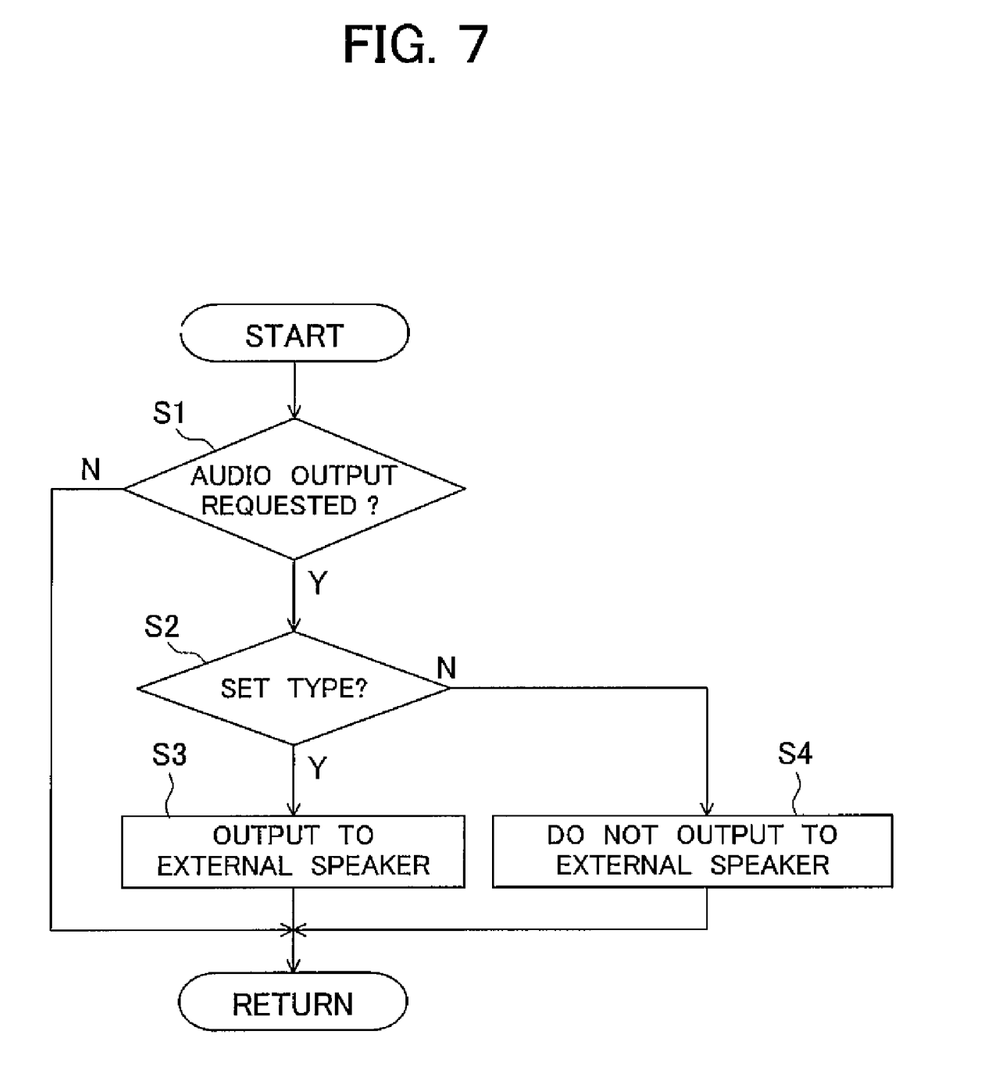
FIG. 7 A flow chart showing a routine of processing executed by a control portion of the mobile phone of FIG. 1B and FIG. 1C for controlling the operation of an external speaker output control portion.

FIG. 7 is a flow chart showing a routine of processing executed by the control portion 31 of the mobile phone 2 in order to realize the operation of FIG. 5B. This processing is for example repeatedly executed in a predetermined cycle (for example 0.5 second) after turning on the power of the mobile phone 2.

At step S1, the control portion 31 judges whether or not an audio output request is generated. For example, it is judged whether or not there is an signal reception and a necessity of outputting an audio notice occurs, whether or not the clock arrives at a set time and there arises a necessity of outputting an alarm sound, and whether or not an instruction of music playback or radio broadcast output occurred via the operation portion 12.

The control portion 31 ends the processing when it judged that there was no audio output request. When it judged that there was an audio output request, at step S2, it compares the type of the audio (audio signal) for which the output of audio is requested with the audio (audio signal) held in the setting data D1 shown in FIG. 6A and judges whether or not the type of the audio requested to be output is the type of the audio set in the setting data D1. Note that the type of the audio for which the output is requested is specified based on for example the information of the type of application requesting the output of the audio included in the audio output request.

When the control portion 31 judged that the type of the audio for which the output had been requested was the set type, that is, when the type of the audio for which the output had been requested was the type of the audio desired by the user to be output from the cradle device 3, for example, when the audio for which the output had been requested was audio of music playback or audio of a radio broadcast, it sets the operation of the external speaker output control portion 43 so as to output the audio signal output from the mixer 41 to the audio signal terminal 36, that is, to the speaker 23 (external speaker) of the cradle device 3 (step S3), and ends the processing.

After this, when an audio signal corresponding to the audio for which the request of audio output occurred or an audio signal including the audio signal is output from the mixer 41, audio corresponding to the audio signal is output from the speaker 23 of the cradle device 3.

On the other hand, when the control portion 31 judged that the type of audio for which the output had been requested was not the set type at step S2, that is, when the type of audio for which the output had been requested was not desired by the user to be output from the cradle device 3, for example, when audio for which the output had been requested was an audio notice (reception sound) or alarm sound, it sets the operation of the external speaker output control portion 43 so as not to output the audio signal output from the mixer 41 to the audio signal terminal 36 (step S4) and ends the processing.

After this, even when an audio signal corresponding to audio for which audio output is requested or an audio signal including the audio signal is output from the mixer 41, audio corresponding to the audio signal is not output from the speaker 23 of the cradle device 3. However the internal speaker output control portion 42 is not set so as to restrict the audio from the mixer 41. Audio for which output is requested is output from the speakers 15 of the mobile phone 2.

Note that, as shown in FIG. 5B, in case that there is an signal reception during music playback, the music playback is suspended, and only an audio notice is output or otherwise in case that only audio for which audio output is requested is output and output of audio during output is suspended, the input of the audio signal of the audio during output to the mixer 41 only has to be suspended or the audio signal only has to be prevented from being mixed at the mixer 41. Further, when the audio notice ends, the speech ends, or other predetermined conditions are satisfied, the mixing only has to be restarted so that the audio of the music which was suspended is output from the speaker 23 of the cradle device 3.

Further, the control portion 31 functions as a signal reception detection portion when it judges presence/absence of signal reception in executing step S1 and functions as an audio judgment portion when it executes step S2.

(Modification)

Figure 6B:
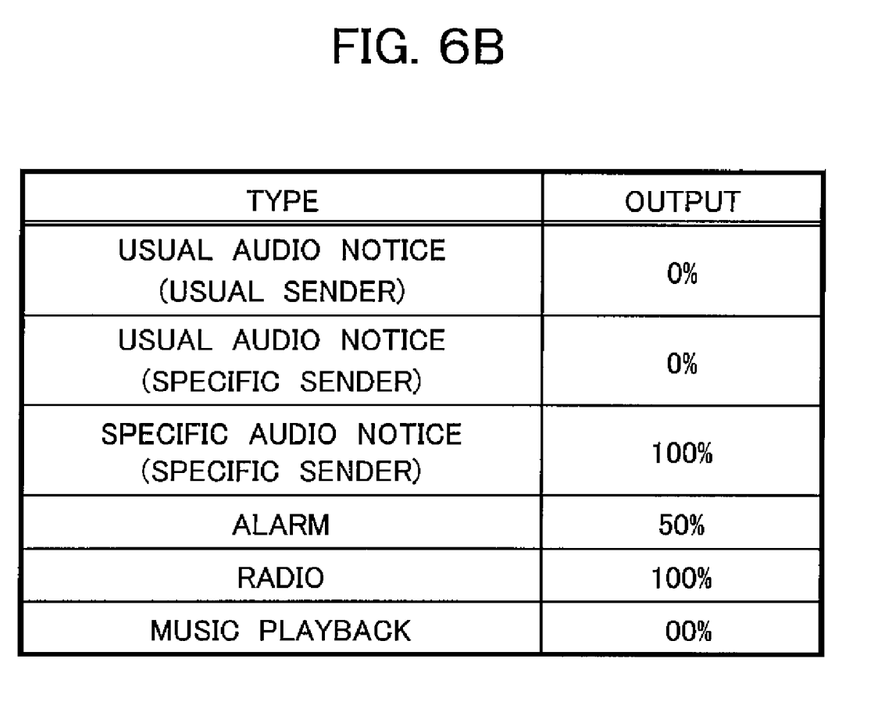

FIG. 6B is a diagram showing an example of a modification of the first embodiment.

The setting data D1 of FIG. 6B holds the type of audio and amount of restriction of output to the cradle device 3 linked together. The amount of restriction of output to the cradle device 3 is set by a ratio with respect to the output when output to the speakers 15 of the mobile phone 2. Note that the output restriction amount and other information may be input by the manufacturer or may be input by the user.

In FIG. 6B, audio notices due to signal reception are classified into three types. Namely, an audio notice due to signal reception from a usual sender and an audio notice due to signal reception from a specific sender registered in a specific data list by a predetermined operation with respect to the operation portion 12 etc. are differentiated from each other, an audio notice from a specific sender is further differentiated into a case where a specific audio notice is not linked with the specific sender and a case where a specific audio notice is linked with the specific sender. When there is signal reception from a specific sender to which a specific audio notice is linked, that specific audio notice is output. The user can thereby learn by the audio notice whether it is communication (reception) from a usual sender or communication (reception) from a specific sender. Note that the specific audio notice may be commonly linked with all specific senders registered in a specific data list or may differ among specific senders as well.

Further, it is set so that when the audio notice is a specific audio notice linked with a specific sender, the output is not restricted, while when another audio notice the output is restricted. In other words, it is set so that an audio notice corresponding to a specific person is output when the sender is a specific sender and set so that the output restriction is lifted when the signal reception is a communication (reception) from a specific sender. However, it is also possible not to restrict the output when there is communication (signal reception) from a specific sender regardless of a specific audio notice being linked with a specific sender.

Further, the alarm sound is set so that the audio signal output from the mixer 41 is restricted to a half output and set so that audios of a radio broadcast and music playback are not restricted in output.

Figure 8:
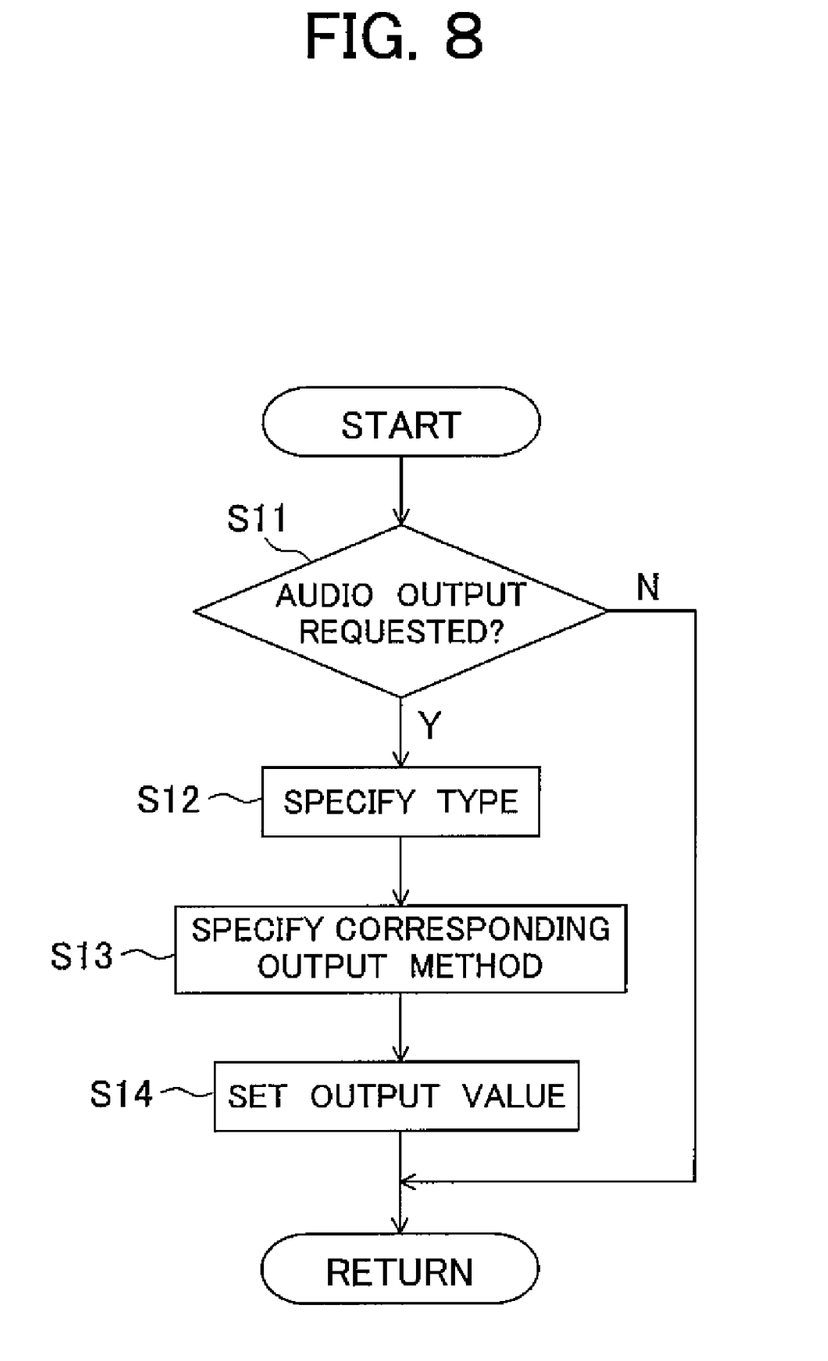
FIG. 8 A flow chart showing a modification of FIG. 7.

FIG. 8 is a flow chart showing a routine of processing executed by the control portion 31 in place of the processing of FIG. 7 in a modification. This processing is, in the same way as FIG. 7, repeatedly executed in a predetermined cycle (for example 0.5 second) after turning on the power of the mobile phone 2.

Step S11 is the same as step S1 of FIG. 7. At step S12, the control portion 31 specifies the type of audio for which the output is requested and, at step S13, searches for the setting data D1 shown in FIG. 6B by using that specified type as a key and specifies the restriction amount (output method) corresponding to the specified type of the audio.

At step S14, the control portion 31 sets the operation of the external speaker output control portion 43 based on the specified output method and ends the processing. After this, when an audio signal corresponding to audio for which an audio output request occurred or an audio signal including the audio signal is output from the mixer 41, the audio corresponding to the audio signal is restricted in output from the speaker 23 of the cradle device 3 by the set restriction amount.

Note that when the type of the audio specified at step S12 is one set in the setting data D1 so that the output is restricted, steps S12 to S14 in the end judge whether or not the type of the audio signal output from the audio processing portion 33 is a specific type and restrict the output when it is judged as the specific type. Therefore, the control portion 31 functions as an audio judgment portion when executing step S12.

Further, the control portion 31 detects signal reception based on the data from the communication processing portion 32 and, at step S12, compares the information of the sender included in the data from the communication processing portion 32 with the specific data list held in the storage device of the mobile phone 2, judges whether or not the sender is a specific sender, and judges whether or not a specific audio notice is linked with the specific sender, so therefore functions as a signal reception detection portion as well.

According to the above embodiment, provision is made of the external speaker output control portion 43 for restricting the output of the audio signal to the speaker 23 of the cradle device 3 when the type of the audio signal output from the audio processing portion 33 is a specific type, therefore the output of audio (for example audio notice) not desired to be output from the speaker 23 by the user from the speaker 23 is restricted, and the feeling of strangeness of the user is suppressed.

Sudden, loud volume output of audio that is not one which is started by user's indication, such as an audio notice, alarm sound, or other audio started by an instruction of a third party or audio started based on the count of the clock, is prevented, and the user is kept from being surprised.

Further, as shown in the modification, by restricting the output in accordance with the sender and the type of the audio notice, signal reception from a specific sender and signal reception from another sender can be differentiated according to the volume of the audio notice from the speaker 23 of the cradle device 3.

Note that in the modification, the output restriction amount was set corresponding to the type of the audio, and the external speaker output control portion 43 is configured to restrict the output of the audio signal to the cradle device 3 in accordance with this output restriction amount, but the configuration is not limited to this. It only has to be configured so that the volume, characteristics, etc. of the audio output from the speaker 23 of the cradle device 3 is controlled (restricted) in accordance with the type of the audio signal.

Second Embodiment

Figure 9:
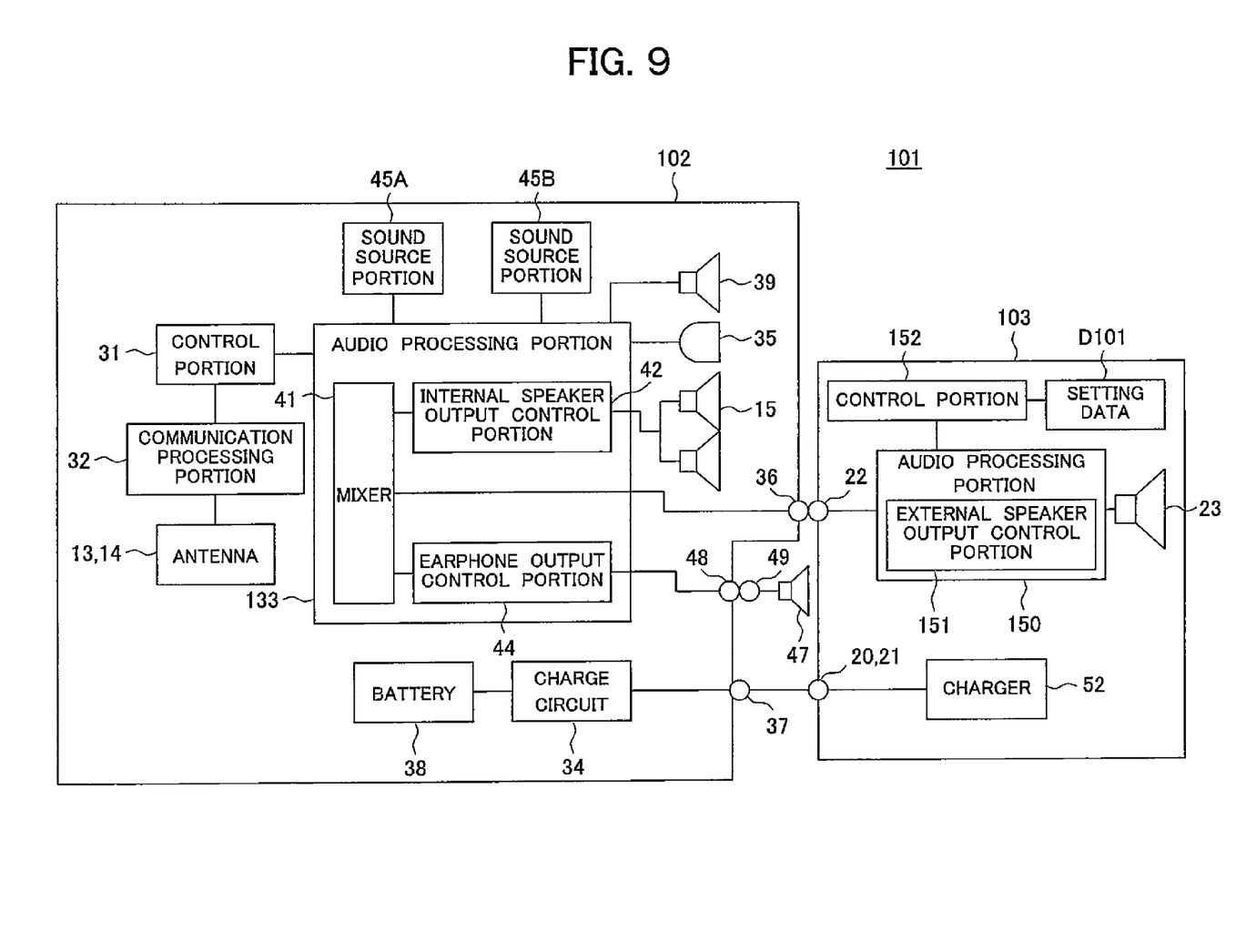
FIG. 9 Front views including partial see-through views showing a mobile phone and a cradle device according to a second embodiment of the present invention.

FIG. 9 is a block diagram showing the configuration of the signal processing system of an audio device 101 provided with a mobile phone 102 and a cradle device 103 of a second embodiment. Note that the structures of the mobile phone 102 and cradle device 103 are the same as those of the first embodiment. Further, the same notations as those in the first embodiment are attached to similar configurations as those in first embodiment.

In the second embodiment, the cradle device 3 is provided with an audio processing portion 150 processing the audio signal input from the audio signal terminal 22 and outputting the same to the speaker 23 and a control portion 152 executing control of the operation of the audio processing portion 150 etc.

The audio processing portion 150 is provided with an external speaker output control portion 151 for controlling the output of the audio signal from the audio signal terminal 22 and outputting the same to the speaker 23. The configuration of the external speaker output control portion 151 is the same as that of the external speaker output control portion 43 of the first embodiment. The operation is controlled by the control portion 152.

The control portion 152 judges whether or not the type of the audio signal input from the audio signal terminal 22 is that set in the setting data D101 by the same processing as that in the first embodiment and restricts the output to the speaker 23 in accordance with the judgment result.

For example, the setting data D101 holds information of the waveform pattern of the audio signal of an audio notice, alarm sound, or other audio not desired by the user. The control portion 152 performs pattern matching between the waveform of the audio signal input from the audio signal terminal 22 and the waveform of the audio signal held in the setting data D101. When the patterns coincide, it controls the operation of the external speaker output control portion 151 so as to restrict the output.

According to the second embodiment, the same effect as that by the first embodiment is obtained. Namely, since the external speaker output control portion 151 for restricting the output of the audio signal to the speaker 23 of the cradle device 103 when the type of the audio signal output from the audio processing portion 133 is the type set in the setting data D101 is provided, the output from the speaker 23 of the audio (for example, an audio notice) not desired by the user to be output from the speaker 23 is restricted, and the feeling of strangeness of the user is suppressed.

Note that, the external speaker output control portion 151 was configured so as to control (restrict) the output of the audio signal output from the mobile phone 102 to the speaker 23, but the configuration is not limited to this. It only has to be configured so that the volume and characteristic etc. of the audio output from the speaker 23 can be controlled.

The present invention is not limited to the above embodiments and may be carried out in various other aspects.

The portable terminal device need only be one that can output an audio signal to outside speakers and is not limited to a mobile phone. For example, it may be PDA or notebook computer as well. The audio output device may be any provided with a speaker for converting the audio signal from a portable terminal device to audio and outputting the same and is not limited to a charging use desktop holder or other cradle devices. For example, it may be a speaker unit to be mounted on a vehicle.

The type (specific type) of the audio signal restricted in output of the audio signal to the speaker can be appropriately selected by at least one of the manufacturer and the user. The type of the audio signal may be defined based on the type of the audio itself as well, for example, classifying the sound of a bell and music into types different from each other or classifying music different from each other into types different from each other. Alternatively, it may be defined based on the type of the information linked with the audio signal or the type of the application requesting the output of that audio signal even when the audios themselves are the same like in the embodiment in which types of the audio notices were classified according to specific senders.

The restriction of the output of the audio signal to the speaker (external speaker) of the audio output device includes control so that the output becomes small with respect to the output of another type of audio signal or with respect to the output of the same type of audio signal to the speaker (internal speaker) of the portable terminal device or control so that the output of the same type of audio signal changes (becomes small) in accordance with the state of the portable terminal device (for example whether during music playback or not). Further, the output may become small temporarily or constantly as well.

For example, a case of setting the output of the audio notice or alarm sound to the external speaker to 0 or 50% was illustrated, but the audio may be output with a so-called step up tone as well so that the output gradually becomes a larger output from 0 or a relatively small output.

The restriction of the output to the external speaker may be made so that the audio signal is not output from the audio output portion, the restriction may be made when the audio signal is output from the audio output portion, or the restriction may be made after the audio signal is output from the audio output portion.

The judgment of the type of the audio signal by the audio judgment portion may be carried out based on the audio signal itself as in the second embodiment or may be carried out based on the information linked with the audio signal, for example, the type of the application requesting the output of the audio and the information obtained simultaneously with the audio output request as in the first embodiment. For example, the output to the external speaker may be restricted by detecting signal reception or arrival at the alarm time. Specifically, it may be judged that the audio signal of the specific type not desired by the user is output when detecting signal reception or arrival at the alarm time, and the output to the external speaker restricted in this case. Further, the judgment may be carried out before the audio signal is output or carried out after the audio signal is output.

The condition for restricting the output to the external speaker is not limited to the type of the audio signal, an appropriate condition may be added. For example, the output may be restricted only when the output request of the audio notice, alarm sound, or other audio not desired by the user is generated during the output of specific audio such as music playback.

The alarm sound only has to be one which output when the counted time reaches the set time and is not limited to the audio which is output in a case where the mobile phone functions as an alarm clock. For example, when set so that a virus exterminating application of the portable terminal device is periodically executed, it may be audio output along with the start of execution of the application as well.

Further, the connection between the portable terminal device and audio output device is not limited to the abutment of terminals against each other. A connection connector etc. may be used as well. Further, the connection is not limited to a contact type connection. The configuration may be made so that the audio signal can be output to the external speaker of the cradle device from the portable terminal device by a non-contact type connection structure etc.

Note that the above embodiments correspond to embodiments of a following method of control of audio output of the audio device of the present invention as well:

A method of control of audio output of an audio device which has a portable terminal device and an audio output device configured to be connectable to the portable terminal device and having a speaker and which can output audio in accordance with an audio signal output from the portable terminal device from the speaker when the portable terminal device and the audio output device are connected, characterized in that the output of the audio from the speaker is restricted when the type of the audio signal output from the portable terminal device is a specific type.

The invention claimed is:

1. A portable terminal device comprising:
an audio output portion that outputs an audio signal and, when an audio output device at which a speaker is arranged is connected to it, outputs the audio signal toward the audio output device so as to make it output audio in accordance with the audio signal from the speaker;
an output restriction portion restricting the output of the audio signal to the audio output device if the type of the audio signal output from the audio output portion is a specific type;
a communication portion executing communication with another communication apparatus; and
a signal reception detection portion for detecting signal reception from the other communication apparatus, wherein
the audio output portion outputs an audio signal of a signal reception sound when signal reception is detected at the signal reception detection portion,
the output restriction portion restricts the output of the audio signal to the audio output device if the audio signal output from the audio output portion is the audio signal of the signal reception sound,
the reception detection portion detects a sender with respect to the signal reception, and
the output restriction portion does not restrict the output of the audio signal of the signal reception sound to the audio output device if it is detected at the signal reception detection portion that the sender with respect to the signal reception is a specific sender.

2. A portable terminal device comprising:
an audio output portion that outputs an audio signal and, when an audio output device at which a speaker is arranged is connected to it, outputs the audio signal toward the audio output device so as to make it output audio in accordance with the audio signal from said speaker;
an output restriction portion that restricts the output of the audio signal to the audio output device if the type of the audio signal output from the audio output portion is a specific type; and
an alarm function portion that outputs an alarm sound, wherein
the audio output portion outputs an audio signal of an alarm sound when a counted time reaches a time set at the alarm function portion, and
the output restriction portion restricts the output of the audio signal to the audio output device if the audio signal output from the audio output portion is the audio signal of an alarm sound.

* * * * *